United States Patent
Baaijens et al.

(10) Patent No.: US 10,327,302 B2
(45) Date of Patent: Jun. 18, 2019

(54) RETAIL SPACE LIGHTING CONTROL SYSTEM AND METHOD

(71) Applicant: SIGNIFY HOLDING B.V., Eindhoven (NL)

(72) Inventors: Johannes Petrus Wilhelmus Baaijens, Eindhoven (NL); Willem Piet Van Hoof, Horst (NL); Edith Danielle Den Hartog, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/770,366

(22) PCT Filed: Oct. 17, 2016

(86) PCT No.: PCT/EP2016/074871
§ 371 (c)(1),
(2) Date: Apr. 23, 2018

(87) PCT Pub. No.: WO2017/067880
PCT Pub. Date: Apr. 27, 2017

(65) Prior Publication Data
US 2018/0317290 A1  Nov. 1, 2018

(30) Foreign Application Priority Data
Oct. 23, 2015 (EP) .................................. 15191145

(51) Int. Cl.
*H05B 37/02* (2006.01)
*H05B 33/08* (2006.01)

(52) U.S. Cl.
CPC ....... *H05B 33/086* (2013.01); *H05B 37/0227* (2013.01); *H05B 37/0272* (2013.01)

(58) Field of Classification Search
CPC H05B 37/02; H05B 37/0227; H05B 37/0245; H05B 37/0272; H05B 33/02; H05B 33/08; H05B 33/0803; H05B 33/0842; H05B 33/0854
See application file for complete search history.

(56) References Cited

U.S. PATENT DOCUMENTS

| 4,225,808 A * | 9/1980 | Saraceni ............ H05B 37/0227 250/205 |
| 8,937,444 B2 | 1/2015 | Ogg et al. |
| 2008/0266130 A1 | 10/2008 | Koo et al. |

(Continued)

FOREIGN PATENT DOCUMENTS

| WO | 2010079388 A1 | 7/2010 |
| WO | 2014128162 A2 | 8/2014 |
| WO | 2015054611 A1 | 4/2015 |

*Primary Examiner* — Jason Crawford
(74) *Attorney, Agent, or Firm* — Meenakshy Chakravorty

(57) ABSTRACT

A lighting system controller comprises a controller for controlling an arrangement of lighting units for implementing different lighting effects. A sensor is used to identify a visitor and also to count the number of visits of the visitor which have taken place, for example while the same lighting effect has been in place. A change in the lighting effect is made based on the number of visits of one or more visitors, again for example with the same lighting effect. In this way, the lighting effect is changed automatically when it needs to be changed in order to maintain the interest of visitors (either individually or as a collective group).

17 Claims, 1 Drawing Sheet

(56) References Cited

U.S. PATENT DOCUMENTS

| | | | |
|---|---|---|---|
| 2010/0277333 A1* | 11/2010 | Van De Sluis | F21V 23/0442 340/686.1 |
| 2015/0123547 A1 | 5/2015 | Fushimi | |
| 2016/0007421 A1* | 1/2016 | Tey Pons | H05B 33/0854 315/113 |
| 2016/0143111 A1* | 5/2016 | Aliakseyeu | H05B 37/0227 315/152 |

* cited by examiner

RETAIL SPACE LIGHTING CONTROL SYSTEM AND METHOD

CROSS-REFERENCE TO PRIOR APPLICATIONS

This application is the U.S. National Phase application under 35 U.S.C. § 371 of International Application No. PCT/EP2016/074871, filed on Oct. 17, 2016, which claims the benefit of European Patent Application No. 15191145.0, filed on Oct. 23, 2015. These applications are hereby incorporated by reference herein.

FIELD OF THE INVENTION

The present system relates to the control of lighting in a retail space. In particular, it relates to a lighting system configured to control and change illumination effect provided by desired light sources upon detection of changes in the environment.

BACKGROUND OF THE INVENTION

Lighting systems enable a particular space, such as an office or a shop or any private or public place, etc., to become a more natural environment by creating lighting conditions familiar and attractive to people. This is especially beneficial in environments that are relatively closed and/or windowless, such as shops, shopping malls, meeting rooms and cubicle offices.

Conventional lighting systems allow control of light sources, such as dimming, switching on/off and color adjustments in order to provide an enriching experience and improve productivity, safety, efficiency and relaxation.

Retail lighting, for example shop lighting, is generally designed and installed for shops selling a variety of goods, such as fashion clothes stores. Typically, spotlights in a fashion store are aimed to create a carefully designed atmosphere to encourage shopping, to emphasize certain goods, and to make the interior look interesting/appealing, etc.

However, in most cases, the lighting design is done once, e.g., upon installation of a lighting system, renovation or the like, and often remains unchanged, at least until a light designer returns after a long period of time. This period may be a year or more, when the designer returns to adjust spotlights to complement new interior changes. The lighting design is intended to express a shop brand identity, which must be strong and easily memorable for shoppers. Additionally, shop personnel are not trained to assess lighting conditions and often do not have time to design the lighting.

However, these issues imply that the shopping experience is not surprising and can even be boring after multiple visits. There is also a trend towards pop up stores, which are stores opened only temporarily for certain periods in different buildings, creating a unique atmosphere in each new building, and this has found to increase customer return rates.

Shoppers want to be inspired, and retailers make a large number of changes to the store appearance to inspire shoppers to come in. Sometimes multiple changes in the positions of items or the layout of displays are made over the course of a day to make sure shoppers see something different each time they pass.

It has been recognized that retail space lighting can play a significant role in attracting customers into a retail outlet. For example, an element of surprise generated by the lighting configuration may also attract the attention of potential customers.

Changing a lighting configuration can be a very costly and labor intensive process. Thus, when shops want to change their atmosphere and lighting more often, this should be made possible in an automatic, pre-defined way, to avoid the high cost and time needed for manual control.

There is therefore a need for a lighting solution which enables dynamic lighting changes which are best able to attract customers to a retail space, but which has the dynamic effect controlled in an automated or semi-automated way.

SUMMARY OF THE INVENTION

The invention is defined by the claims.

Examples in accordance with an aspect of the invention provide a lighting control system for controlling an arrangement of lighting units in a display area or a space, comprising:

a controller for controlling the lighting units for implementing different lighting effects; and at least one sensor for sensing the presence and an identity of at least one visitor to, or immediately outside, the display area of the space and for determining the number of visits of said at least one visitor, wherein the controller is adapted to implement a change in the lighting effect applied to said display area or said space in dependence on a parameter which is based on the number of visits of said at least one visitor to, or immediately outside, said display area or said space, so as to present said at least one visitor with a new visiting experience to said display area or said space.

This system makes automatic and dynamic changes to lighting effects based on the number of visits of a visitor or multiple visitors (e.g. potential customers). Thus, the lighting effect may be changed when a visitor has already seen the lighting effect one or more times in their previous visits. The lighting effect may be targeted at a single visitor, for example a region of a display area of space, or it may be targeted at all visitors, for example the interior lighting of s apace.

The lighting effect may be adapted to be varied in either case based on a parameter relating to the previous visits with the same lighting effect.

The controller may be adapted to store information about the lighting effect that was in place during each visit. In this way, it is possible to associate visits with the lighting effect at that time, and thereby keep historical information about the number of visitors who have already experienced a particular lighting effect and how many times.

In a first set of examples, the parameter may comprise the number of visits by a particular visitor to a display area. The display area may for example be a shop window for displaying items to a potential visitor of the shop, a showcase inside a shop for displaying articles in the shop or a spot display or point of sale inside or immediately outside the shop for promoting a particular item. As a display area may be primarily intended to interact with an individual visitor, the lighting effects in the display area may be used to enhance that interaction. Thus, the number of times that individual visitor has experienced a particular lighting effect may be taken into account in implementing a change in the lighting effect applied to the display area. For example, the controller may be adapted to implement a change in the lighting effect for each visit of a particular visitor.

In this way, for a lighting system for a retail shopping space, the lighting may change each time a shopper passes a shop window or display area to make sure the shopper each time is presented with a different visiting experience, e.g. sees something different, without any additional effort for the staff of the retail outlet.

In a second set of examples, the parameter is based on the number of visits by all visitors to a space. The space may be the interior of a shop or a particular section of a shop. The space may also be a booth at an exhibition/fair. Such spaces are typically intended to receive multiple visitors and the lightings effects implemented in said spaces are collectively experience by the multiple visitors. Changes in lighting effects are therefore a collective experience.

In this way, the lighting inside the space, which is intended for multiple visitors at the same time, may be controlled such that the multiple users—as a group—collectively is presented with a different experience, e.g. are immersed in a different light setting or atmosphere. In this case, the number of previous visits of all current visitors is taken into account in deciding when to change the lighting effect. In a further example, the lighting effect experiences by all current visitors in their previous visits may be taken into account in deciding when and how to change the lighting effect in the space.

For example, the controller may be adapted to set a threshold for:

the average number of visits by all visitors with the same lighting effect; or the percentage of visitors who have reached a given number of visits with the same lighting effect.

In this way, the interior atmosphere conditions may be made dependent on the number of previous shop visits (over a previous time interval) of the shoppers that are present in the shop. The average number of shop visits may for example be determined based on a defined period of time before the current time, for example during 4 weeks before the actual day. Alternatively, as soon as a particular fraction of the visitors (e.g. 50%) have already experienced the current lighting effect more than twice (i.e. they have reached a given number of visits of 3) the lighting effect is changed. Of course, more complicated algorithms may be used which take into account the number of visits by all visitors to the inside of the space.

The space may comprise one or more display areas such as showcases or spot displays. A display area implemented as a shop window may be considered part of a shop and therefore 'inside' a space or alternatively may be considered just outside the actual visiting area of the shop and therefore 'immediately outside' a space.

The space may comprise a window display (also known as shop window), and the lighting effect then comprises:

illumination of a sub-set of items in the window display; or a different color of illumination; or a change in lighting as well as a change in additional content such as sound or video content.

There are different ways to implement changes in the effect provided by the lighting, and any of these may be used to put into place a change which will be noticed by visitors.

The at least one sensor is for example for wirelessly obtaining identity information from a mobile phone, smart watch, or shop loyalty device. The wireless communication may use Bluetooth or a WiFi connection or any other suitable wireless communication protocol which enables visitors to be identified. In some embodiments the sensor may be located in or closely to a display area to obtain identity information from a mobile phone, smart watch, or shop loyalty device visiting the display area. If the display area is a shop window, the sensor for detecting/identifying people visiting the shop window may be located in the shop window (e.g. a camera sensor in the shop window detecting/identifying people in front of the shop window). In other embodiments the sensor may be located at the entrance of a visiting space, for example at the entrance of a shop or section of a shop, or may be located centrally in the space. Embodiments may comprise an arrangement of multiple sensors distributed across the display area or the space for sensing the presence and identity of a visitor to the display area or the space. The arrangement of sensors may also sense the presence and identity of a plurality of visitor to the display area or the space and their sensor information may be aggregated into aggregate visitor information for the purpose of changing lighting effect(s) in the display area or the space.

Examples in accordance with a second aspect of the invention provide a method of providing lighting to a display area or a space, comprising:

sensing the presence and an identity of at least one visitor to, or immediately outside, the display area or the space and determining the number of visits of said at least one visitor; and implementing a change in the space lighting effect applied to said display area or said space in dependence on a parameter which is based on the number of visits of said at least one visitor to, or immediately outside, said display area or said space, so as to present said at least one visitor with a new visiting experience to said display area or said space.

This method enables automatic adjustment of a lighting effect based on the extent to which a visitor (or visitors) have already visited the display are or the space, and for example already experienced a particular lighting effect.

The method may comprise storing information about the lighting effect that was in place during each visit. This provides the required historical information to enable the previous lighting effect already presented to the different visitors to be consulted when determining if a new lighting effect is to be applied.

The parameter may comprise the number of visits by a particular visitor to a display area or a space. This example enables lighting to be tailored to a particular visitor. A change in the lighting effect may for example be made for each visit of a particular visitor.

The parameter may instead be based on a threshold for:

the average number of visits by all visitors with the same lighting effect; or the percentage of visitors who have reached a given number of visits with the same lighting effect.

In this way, the overall lighting provided to multiple visitors may be controlled based on a function which takes into account the historical information for all visitors.

Other control approaches may be taken with the visit information. For example an extent to which visitors are making frequent repeat visits can be determined. If many visitors are returning quickly, lighting changes may be made to give them a different effect during these repeat visits. If few visitors are returning quickly it may be an indication that the lighting effect is not attractive, so should be changed earlier than it might otherwise have been.

The invention may be implemented by a computer program.

The invention also provides a lighting system comprising the lighting control system defined above in combination with the lighting arrangement itself.

BRIEF DESCRIPTION OF THE DRAWINGS

Further areas of applicability of the present systems and methods will become apparent from the detailed description provided hereinafter. It should be understood that the detailed description and specific examples, while indicating exemplary embodiments of the systems and methods, are intended for purposes of illustration only and are not intended to limit the scope of the invention. These and other features, aspects, and advantages of the apparatus, systems and methods of the present invention will become better understood from the following description, appended claims, and accompanying drawing in which:

DETAILED DESCRIPTION OF THE EMBODIMENTS

The invention provides a space lighting control system for controlling an arrangement of lighting units for implementing different lighting effects. A sensor is used to identify a visitor and also to count the number of visits of the visitor which have taken place, for example while the same lighting effect has been in place. A change in the lighting effect is made based on the number of visits of one or more visitors, again for example with the same lighting effect. In this way, the lighting effect is changed automatically when it needs to be changed in order to maintain the interest of visitors (either individually or as a collective group).

Figure 1:
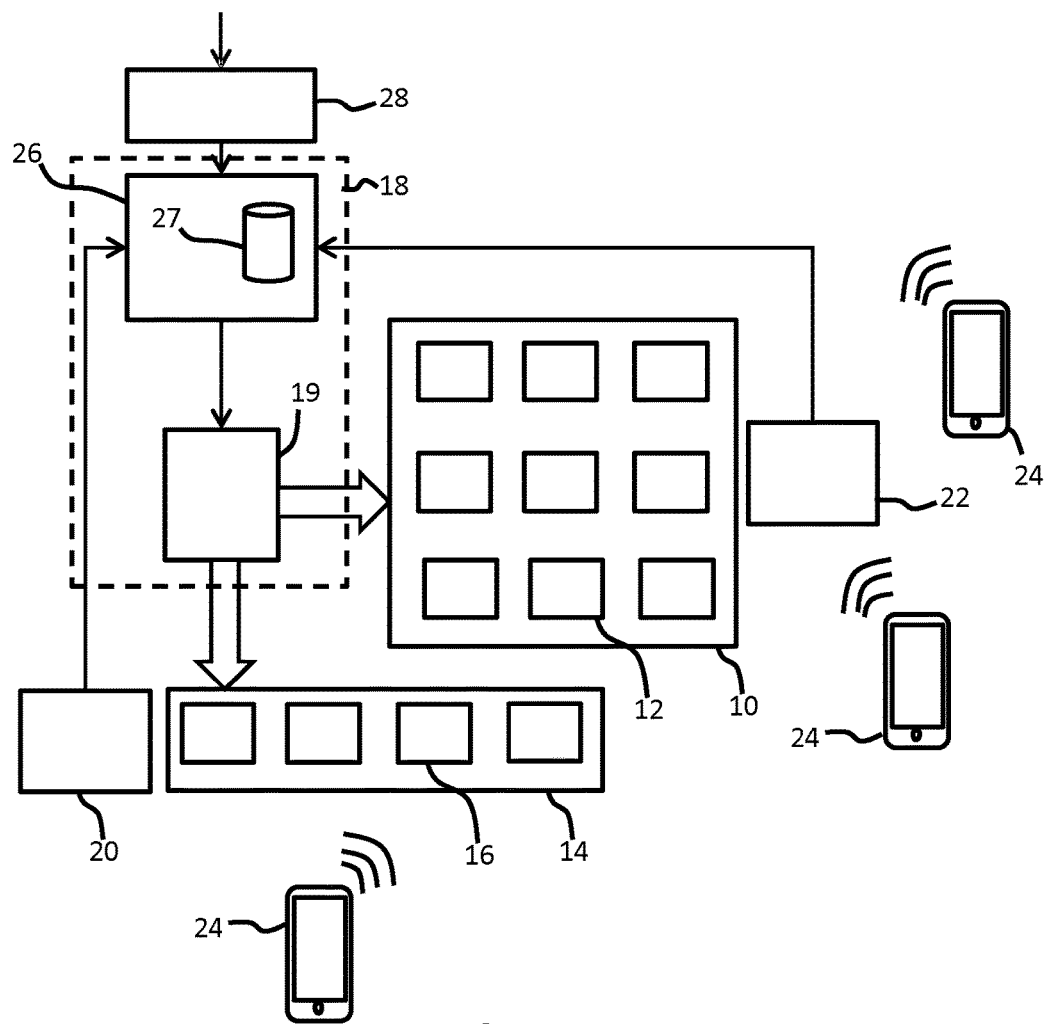
FIG. 1 shows a lighting system.

FIG. 1 shows a lighting system comprising a set of lighting units and a controller. The lighting units comprise a first set 10 of lighting units 12 for providing lighting to the interior of a retail space and a second set 14 of lighting units 16 for providing lighting to a window display of the retail space.

The controller comprises an overall system controller 18 which includes a lighting controller 19 for controlling both sets 10, 14 of lighting units. The system controller 18 is able configure the sets of lighting units into different configurations, which are then implemented by the lighting controller 19 to provide different lighting effects. The lighting controller 19 may be an entirely conventional configurable lighting controller, and the additional intelligence is provided by the other parts of the system controller 18.

In respect of the interior of the retail space, the lighting effect is for example aimed at changing the overall atmosphere and feel of the space. It may involve different lighting colors, intensities and dynamic effects. It may also involve different ancillary effects such as sound, and displayed video content. In respect of the window display lighting, the lighting effect may also be aimed at changing the overall atmosphere and feel using different lighting colors, intensities and dynamic effects. However, it may also be aimed at illuminating different objects or regions within the window display. It may again involve different ancillary effects such as sound, and displayed video content.

The overall system further comprises a sensor arrangement. A first sensor or set of sensors 20 is used to detect the presence of visitors, i.e. shoppers, in the vicinity of the window display. A second sensor or set of sensors 22 is used to detect the presence of visitors inside the retail space.

The sensors are wireless sensors for detecting visitors based on signals detected from portable wireless devices 24 carried by the visitors. These may comprise smart phones, smart watches or shop loyalty cards. Communication between the devices 24 and the sensors 20, 22 enables the presence and identity of visitors to be established. The visitor identity does not need to be linked to a personal identity—rather it only needs to be sufficient to enable different visitors to be distinguished from each other. The sensors may for example gather a Bluetooth signature of the visitors. Any identification information may be used such as a WiFi profile, or a near field communication profile of the phone.

The system controller 18 further comprises an analysis unit 26 as a processor and associated memory, wherein the processor processes the sensor information in order to determine in an automatic way when the lighting effect should be changed, in the interior space, or in the display window, or both. The analysis unit 26 has a database 27 or other memory for storing information about the lighting effect that was in place during each visit of each visitor. In this way, it is possible to associate visits of identified visitors with the lighting effect that was in place at that time. Thus, historical information about the number of visitors who have already experienced a particular lighting effect, and the number of times they have experienced that lighting effect, is gathered.

The different lighting effects may be programmed by a user of the system through an input interface 28, and the way the sensor data is interpreted and acted on may also be programmed.

The system makes automatic and dynamic changes to lighting effects based on the number of visits which visitors (e.g. potential customers) have already experienced with the same lighting effect. Thus, the lighting effect may be changed when a visitor has already seen the lighting effect one or more times in their previous visits.

In a first set of examples, the lighting effect may be targeted at a single visitor. This may for example apply to the first set 14 of lighting units for the window display. It is preferable to limit the number of times that an individual visitor experiences a particular lighting effect in succession. For example, the system controller 18 may implement a change in the lighting effect for each visit of a particular visitor to an area which has illumination intended for a single visitor.

The window display lighting for example comprises multiple spot lights 16 in the shop window. In a current pre-set configuration, some of the spot lights are switched on, highlighting certain items in the window display, while other spot lights are switched off, which means some items are not highlighted.

In operation of the system, the sensor 20 collects the identity such as the Bluetooth signature of a visitor, i.e. a potential shopper. When the visitor passes and has his Bluetooth connection switched on, the analysis unit 26 collects the Bluetooth signature of the phone (or phone identifier) and saves this together with the current pre-set lighting configuration. After a while, the visitor may return. The sensor 20 then recognizes the signature and the analysis unit 26 retrieves the earlier pre-set lighting configuration stored in the database. At this time the dynamic lighting is set to a different pre-set configuration, highlighting different items to let the shopper experience the window display in a different way, with the focus on different items. In this way, the lighting changes each time a shopper passes to make sure the shopper sees something different each time, without any additional effort for the staff of the retail outlet.

The dynamic light setting may also or instead include colored lighting with a different color used each time the shopper passes. Additional control functions may be implemented, for example using motors under the control of the system controller 18 to change the direction of one or more of the lighting units. Motors may also be used to control a beam width of the lighting units via controllable diffuser, for example, and thus the direction and width of the light emanating therefrom.

In a further implementation, the pre-set lighting configuration also includes other parameters such as music, dynamic movement in the display, odor and/or video content on a display.

In a second set of examples, the lighting effect is targeted at all visitors, for example the interior lighting providing by the first set 10 of lighting units. In this case, the number of previous visits (with the same lighting effect) of all current visitors is taken into account in deciding when to change the lighting effect.

For example, in a most simple implementation of a control algorithm, the lighting effect is changed based on the average number of visits of all present shoppers based on the current lighting effect. This average may be calculated from the time the lighting effect was last changed or it may be calculated from a certain time interval prior to the actual visit (so that not all historical data needs to be stored). This time interval may for example be a 4 week time window. If a customer has not visited the shop for 4 weeks, they are unlikely to remember the previous lighting effect, so the history more than 4 weeks old (or any other threshold such as 6 weeks or 8 weeks) may be disregarded.

In this way, the database 27 operates in a time-shift manner, containing identification of each of the shop visitors during the defined period of time prior to and including the actual time.

When the lighting effect is to be changed, this may be implemented based on a predefined look up table of atmosphere and lighting conditions. As explained above, different atmosphere and lighting conditions may include scent, sound, music, and video aspects. The pre-defined configurations may be stored in the database 27 or other memory.

Instead of simply using the average number of visits for all present visitors, a more intelligent algorithm may be used. For example the criteria for changing the lighting effect may be that a certain percentage (P) of people present that have visited more than N times in the previous period (i.e. the same lighting effect).

The percentage P may be 33%, 50% or 67% for example. The number of visits N may be 2 or 3 for example. More complicated algorithms may be used.

Figure 2:
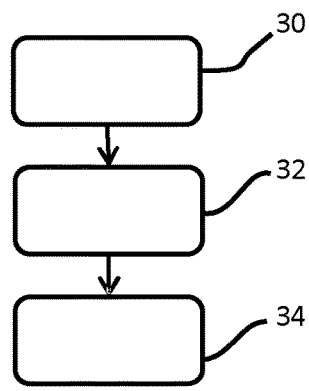
FIG. 2 shows a lighting control method.

The invention also provides a lighting control method as shown in FIG. 2. FIG. 2 shows a method of providing retail space lighting, comprising sensing the presence and an identity of each visitor to, or immediately outside, the retail space in step 30.

In step 32, the number of visits of each visitor is determined, based on previously stored information concerning visits from the same visitor.

In step 34 a change in the retail space lighting effect is made in dependence on a parameter which is based on the number of visits of one or more visitors with the same lighting effect.

The parameter for example comprises the number of visits by a particular visitor to a display area at the outside of the retail space or the average number of visits by all visitors with the same lighting effect, or the percentage of visitors who have reached a given number of visits with the same lighting effect.

The system above combined window display lighting and interior lighting. Of course a system may have only the dynamic control of the window display or of the interior lighting.

It is explained above that the system only needs to collect sensor data sufficient to distinguish between visitors. The unique identifier for each visitor may be stored as a code without any personal data and not linked to any other database.

However, the sensor may optionally also collect personalized information, for example based on a stored profile, installed shop app, loyalty card, or profile on a social network. Based on this information the system can make a better prediction of the preferences of the shopper and base the choice of a pre-set lighting configuration on the profile of the visitor. The sensor may even collect visual and/or physical information of the shopper, e.g. height, weight and visual parameters such as position of facial features.

The system is of particular interest for retail spaces. However, it is generally of interest for commercial or public spaces, or even more generally for spaces where people choose freely to visit.

The examples above are based on changing the lighting effect when visitors have experienced the lighting effect for a previous number of visits. There are other ways to use the visitor information.

For example, the lighting effect may be changed if the percentage of the visitors that have already previously been in the space in a recent time period (e.g. a number of hours, or a small number of days), exceeds a certain threshold. The purpose of this is to identify when there is a rapid occurrence of repeat visits. The aim is then to surprise the visitors with a new ambience to enhance the experience before it gets boring. This may result in the ambience changing more quickly based on detection of a large amount of repeat visits after a short time.

The lighting effect may also be changed if the percentage of the visitors that have already previously been in the space in a recent time period (e.g. a small number of days), decreased below a different threshold. This may indicate that visitors have not come often because the space is unattractive. Changing the atmosphere can help to enhance the attraction of the space and stimulate more repeated visits.

The lighting units may be light emitting diodes (LEDs) since they are particularly well suited light sources to controllably provide light of varying attributes, as LEDs may easily be configured to provide light with changing colors, intensity, hue, beam shape, saturation, beam shape and other attributes, and typically have electronic drive circuitry for control and adjustment of the various light attributes. However, any controllable light source may be used that is capable of providing lights of various attributes, such as various intensity levels, different colors, hues, saturation and the like, such as incandescent, fluorescent, halogen, or high intensity discharge (HID) light, LEDs and the like, which may have a ballast or drivers for control of the various light attributes.

The various elements and components of the system controller 18 and the sensors may be interconnected by a wired bus or by wireless connections using various protocols such as ZigBee, DMX and/or Bluetooth™, to control the lighting units, for example, including through a local or wide area network such as the Internet, for remote monitoring, communication and control.

The system controller 18 may receive manual input from the user interface 28, and in response, determine and select a desired lighting effect, for example to override the automatic system operation. The overall system may thus provide a user controllable system as well as an automatic dynamic system.

The order in which different lighting effects are presented when in the automated mode may be random or predefined and stored in the system controller, for example in a repeating loop having a finite number of different lighting effects.

As explained above, the control method is particularly suited to be carried out by computer software. Application data and other data are received by the system controller for configuring it to perform operation acts in accordance with the present systems and methods. Such software, application data as well as other data may of course be embodied in a computer-readable medium, such as an integrated chip, a peripheral device or memory, such as a memory of the analysis unit 26 shown in FIG. 1, or other memory coupled to the system controller.

The computer-readable medium and/or memory may be any recordable medium (e.g., RAM, ROM, removable memory, CD-ROM, hard drives, DVD, floppy disks or memory cards) or may be a transmission medium (e.g., a network comprising fiber-optics, the world-wide web, cables, and/or a wireless channel using, for example, time-division multiple access, code-division multiple access, or other wireless communication systems). Any medium known or developed that can store information suitable for use with a computer system may be used as the computer-readable medium and/or memory.

Additional memories may also be used. The computer-readable medium, the memory, and/or any other memories may be long-term, short-term, or a combination of long-and-short term memories. These memories configure the system controller to implement the methods, operational acts, and functions disclosed herein. The memories may be distributed or local and the processor, where additional processors may be provided, may be distributed or singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network, such as the Internet, is still within memory, for instance, because the processor may retrieve the information from the network.

The controllers/processors and the memories may be any type. The processor may be capable of performing the various described operations and executing instructions stored in the memory. The processor may be an application-specific or general-use integrated circuit(s). Further, the processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi-purpose integrated circuit. Each of the above systems utilized for remote controlling of light sources may be utilized in conjunction with further systems.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A lighting control system for controlling an arrangement of lighting units wherein the lighting units are located in a display area or a space, the lighting control system comprising:
a controller for controlling the lighting units for implementing different lighting effects; and at least one sensor for sensing the presence and an identity of at least one visitor to, or immediately outside, the display area or the space and for determining the number of visits of said at least one visitor,
wherein the controller is adapted to implement a change in a lighting effect applied to said display area or said space, wherein said change is triggered by said presence sensing of said at least one visitor and a parameter which is based on the number of visits of said at least one visitor to, or immediately outside, said display area or said space, so as to present said at least one visitor with a new visiting experience to said display area or said space.

2. A system as claimed in claim 1, wherein the parameter is based on the number of visits with the same lighting effect.

3. A system as claimed in claim 1, wherein the controller is adapted to store information about the lighting effect that was in place during each visit of said at least one visitor.

4. A system as claimed in claim 1, wherein the parameter comprises the number of visits by a particular visitor to the display area.

5. A system as claimed in claim 4, wherein the controller is adapted to implement a change in the lighting effect for each visit of a particular visitor.

6. A system as claimed in claim 1, wherein the parameter is based on the number of visits by all visitors to the space.

7. A system as claimed in claim 6, wherein the controller is adapted to set a threshold for:
the average number of visits by all visitors with the same lighting effect; or
the percentage of visitors who have reached a given number of visits with the same lighting effect.

8. A system as claimed in claim 1, wherein the display area comprises a shop window for displaying a plurality of items, and the change in the lighting effect comprises illumination of a sub-set of items in the shop window or illumination with a different color.

9. A system as claimed in claim 1, wherein the controller is further adapted to implement a change in additional content of at least one of a scent, a sound, music and video content.

10. A system as claimed in claim 1, wherein the at least one sensor is for wirelessly obtaining identity information from a mobile phone, smart watch, or shop loyalty device.

11. A system as claimed in claim 1, wherein said change is triggered by said presence sensing of said at least one visitor and the determined number of visits of said at least one visitor.

12. A method of providing lighting to a display area or a space, comprising:
sensing the presence and an identity of at least one visitor to, or immediately outside, the display area or the space and determining the number of visits of said at least one visitor; and
implementing a change in a lighting effect applied to said display area or said space, wherein said change is triggered by said sensing of presence of said at least one visitor and a parameter which is based on the number of visits of said at least one visitor to, or immediately outside, said display area or said space, so as to present said at least one visitor with a new visiting experience to said display area or said space.

13. A method as claimed in claim 12, comprising storing information about the lighting effect that was in place during each visit.

14. A method as claimed in claim 12, wherein the parameter comprises the number of visits by a particular visitor to the display area and wherein the method further comprises implementing a change in the lighting effect for each visit of a particular visitor.

15. A method as claimed in claim 12, wherein the parameter is based on the number of visits by all visitors to the space, the method further comprising setting a threshold for:
   the average number of visits by all visitors with the same lighting effect; or
   the percentage of visitors who have reached a given number of visits with the same lighting effect.

16. A non-transitory storage medium comprising a computer program of instructions that, when executed by a hardware processor, cause the hardware processor to perform the method of claim 12.

17. The method as claimed in claim 12, wherein said change is triggered by said presence sensing of said at least one visitor and the determined number of visits of said at least one visitor.

* * * * *